United States Patent [19]

Beacom et al.

[11] 4,170,039
[45] Oct. 2, 1979

[54] VIRTUAL ADDRESS TRANSLATION SPEED UP TECHNIQUE

[75] Inventors: Thomas J. Beacom, Rochester; Douglas M. Kindseth, Stewartville; Glen R. Mitchell, Pine Island, all of Minn.

[73] Assignee: International Business Machines Corporation, Armonk, N.Y.

[21] Appl. No.: 925,148

[22] Filed: Jul. 17, 1978

[51] Int. Cl.² .............................................. G06F 9/10
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,693,165 | 9/1972 | Reiley et al. | 364/200 |
| 3,723,976 | 3/1973 | Alvarez et al. | 364/200 |
| 3,725,874 | 4/1973 | Marie et al. | 364/200 |
| 3,761,881 | 9/1973 | Anderson et al. | 364/200 |
| 3,781,808 | 12/1973 | Ahearn et al. | 364/200 |
| 3,825,904 | 7/1974 | Burke et al. | 364/200 |
| 3,938,100 | 2/1976 | Steiner | 364/200 |
| 4,050,094 | 9/1977 | Bourke | 364/200 |
| 4,053,948 | 11/1977 | Hogan et al. | 364/200 |
| 4,057,848 | 11/1977 | Hayashi | 364/200 |
| 4,068,303 | 1/1978 | Morita | 364/200 |

Primary Examiner—Mark E. Nusbaum
Attorney, Agent, or Firm—Donald F. Voss

[57] ABSTRACT

Address translation apparatus is provided where the address to be translated is compared with two address translation candidates sequentially. The virtual address to be translated is contained in a virtual address register. A field of bits within the virtual address are presented simultaneously as an address to a translation table and a pre-translation table where the pre-translation table has two entries per row and each entry contains some of the virtual address bits of corresponding candidates in the translation table. The pre-translation table is quite narrow compared to the translation table and is preferably, but not necessarily, implemented in latches or as a very fast array compared to the translation table. The selected entries from the pre-translation table are compared with corresponding bits from the virtual address register and the results of the precompare generate an address bit which together with the other address bits select the candidate from the translation table which is more likely to compare with a larger group of address bits from the virtual address register. In the event both entries from the pre-translation table compare with the corresponding bits from the virtual address register and the selected candidate from the translation table does not compare with the larger group of address bits from the virtual address register, the address bit from the precompare is forced to an opposite state whereby the other candidate is selected.

8 Claims, 6 Drawing Figures

VIRTUAL ADDRESS TRANSLATION SPEED UP TECHNIQUE

DESCRIPTION

BACKGROUND OF THE INVENTION

The invention relates to virtual address translation apparatus and, more particularly, to such apparatus for translating large virtual addresses and, still more particularly, to virtual address translation apparatus where two or more virtual addresses can translate to the same translation table address or index and where each index specifies two candidates for the address translation and, still more particularly, to virtual address translation apparatus where the two address translation candidates are accessed sequentially.

The invention finds particular utility in a computer system where the virtual address has a large number of bits, such as a computer system having a single level store architecture.

DESCRIPTION OF THE PRIOR ART

In the past it has been the practice to use some portion of the virtual address register to address a table of candidates where the entries in the table contain a virtual address and a corresponding real main storage address. The table of candidates are arranged in rows where each row can have more than one candidate to facilitate comparisons in parallel with the contents of the virtual address register. The real main storage address associated with the virtual address candidate which compares with the contents of the virtual address register is then the translated real main storage address. Normally, a portion of the virtual address in the virtual address register forms part of the real main storage address and is concantenated with the real main storage address taken from the table.

Although the arrangement of having multiple entries in a single row of the table array speeds up the translation process, such wide arrays from a practical point of view are either unavailable, very costly or have a slow access time. The alternative is to provide a table array having only a single entry per row and make sequential multiple accesses if necessary to accomplish the translation. The present invention utilizes a translation table array having a single candidate per row but provides a significant improvement by using a narrow pre-translation table with multiple entries per row for a parallel precompare and using the result thereof for selecting the candidate which is more likely to compare and thereby speed up the sequential comparisons because normally a second comparison isn't required. In the present invention the parallel precompare is on a subgroup of virtual address bits to select the more favored candidate. By this arrangement it has been found that the more favored candidate has a success rate of comparing with the virtual address to be translated approximately 93% of the time compared to a success rate of 50% when the candidates are accessed on a non-preferential basis.

When the precompare in the present invention indicates that both candidates have an equal chance of success, one candidate is arbitrarily chosen to be compared first and if that candidate fails, the other candidate is selected by merely changing the state of the address bit provided by the precompare. In other words, each pair of candidates are ordered in the table so as to be separated by a constant value represented by a single bit, for example, the high order bit of the table address. The first entry of the table would be at row 1, for example, and the associated entry for forming the pair of entries would be row 33. The state of the high order bit for addressing the first 32 rows would be zero whereas it would be 1 for rows 33 and above for a table array having 64 entries.

SUMMARY

The principal objects of the invention are to provide improved virtual address translation apparatus which:
(A) is able to translate very large virtual addresses;
(B) is able to increase the speed of translation in an arrangement where the candidates are sequentially accessed; and
(C) is less expensive than virtual address translation apparatus using table arrays with multiple entries per row.

The foregoing objects are achieved by providing a pre-translation table which is accessed at the same time and by the same address as used for the translation table. The pre-translation table is narrow compared to the translation table and thus can be implemented in more expensive, higher speed technology. Additionally, the candidates in the pre-translation table are paired side by side, i.e., multiple entries in each row. Thus the pre-translation table is half as long as the translation table. The additional bit required for addressing the translation table comes from the precompare logic for comparing the candidates from the pre-translation table with a subgroup of address bits from the virtual address register. The precompare develops an address bit for selecting the candidate more likely to compare on a full address basis. If the precompare indicates that neither candidate is a preferred candidate, i.e., both precompares result in an equal compare, then one of the candidates is arbitrarily selected for the first comparison and if that first comparison fails, the address bit developed by the precompare is forced to an opposite state and the second candidate is selected.

It is thus seen that the present invention is slower than a parallel compare and faster than an arbitrary sequential compare. It is also seen that the present invention is less expensive than a full parallel compare.

DESCRIPTION OF THE DRAWINGS

FIGS. 2-1 and 2-2 taken together with FIG. 2-2 disposed to the right of FIG. 2-1 are a logic circuit diagram of a preferred embodiment of the present invention where the real main storage address is carried in the pre-translation table;

DESCRIPTION

Figure 1:
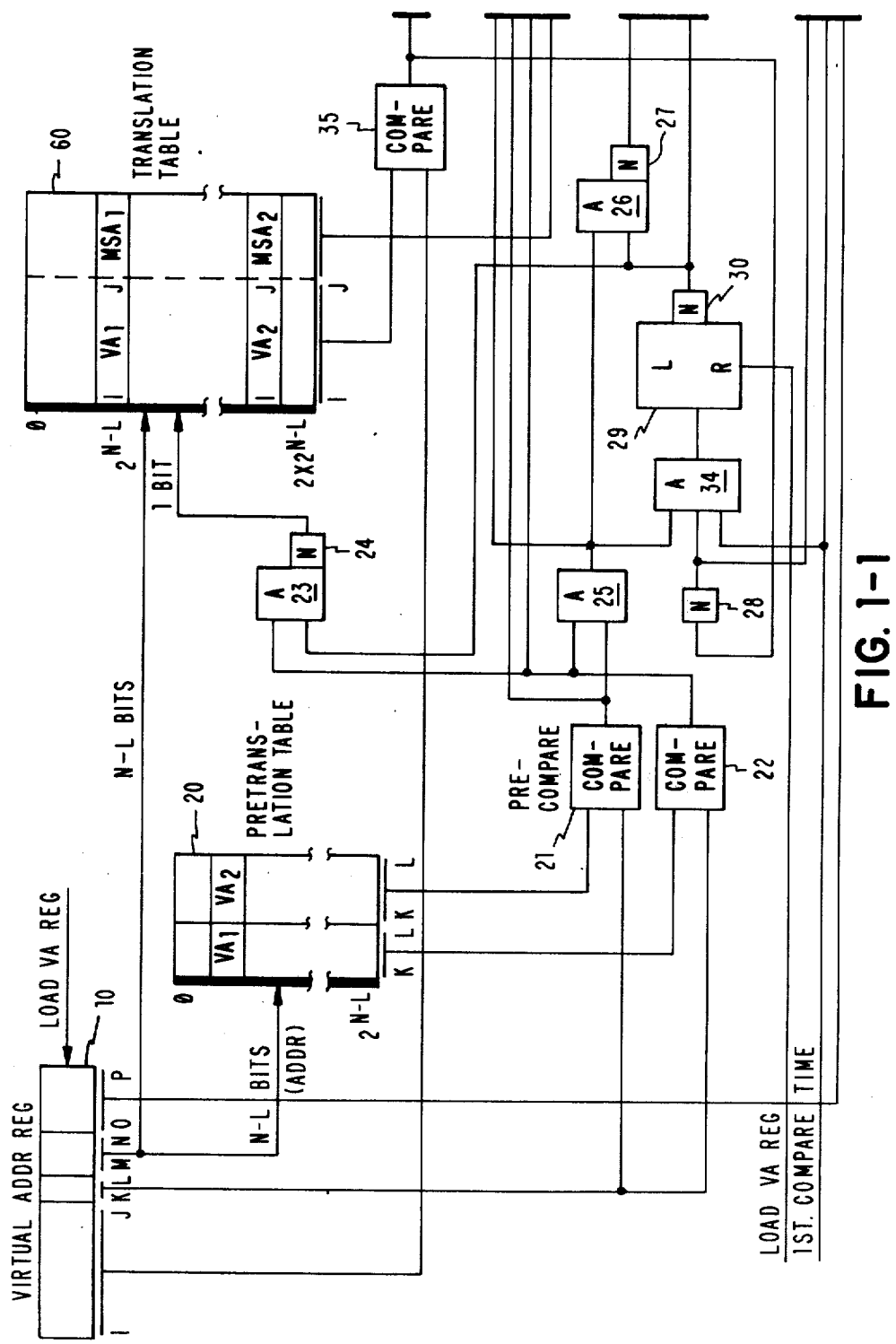
FIGS. 1-1 and 1-2 are a logic diagram illustrating the invention where the real main storage address is carried in the translation table.
Figures 1, 2:
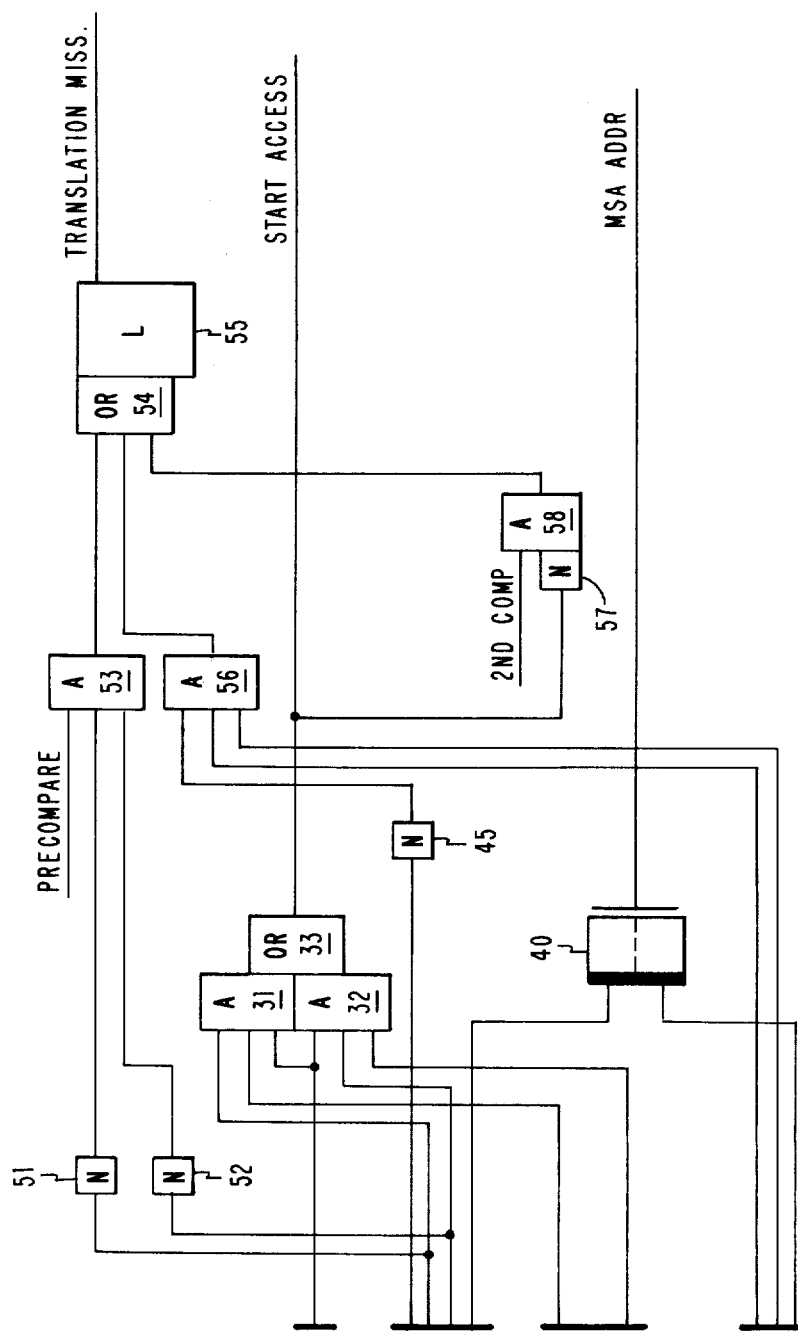
Figures 1, 2:
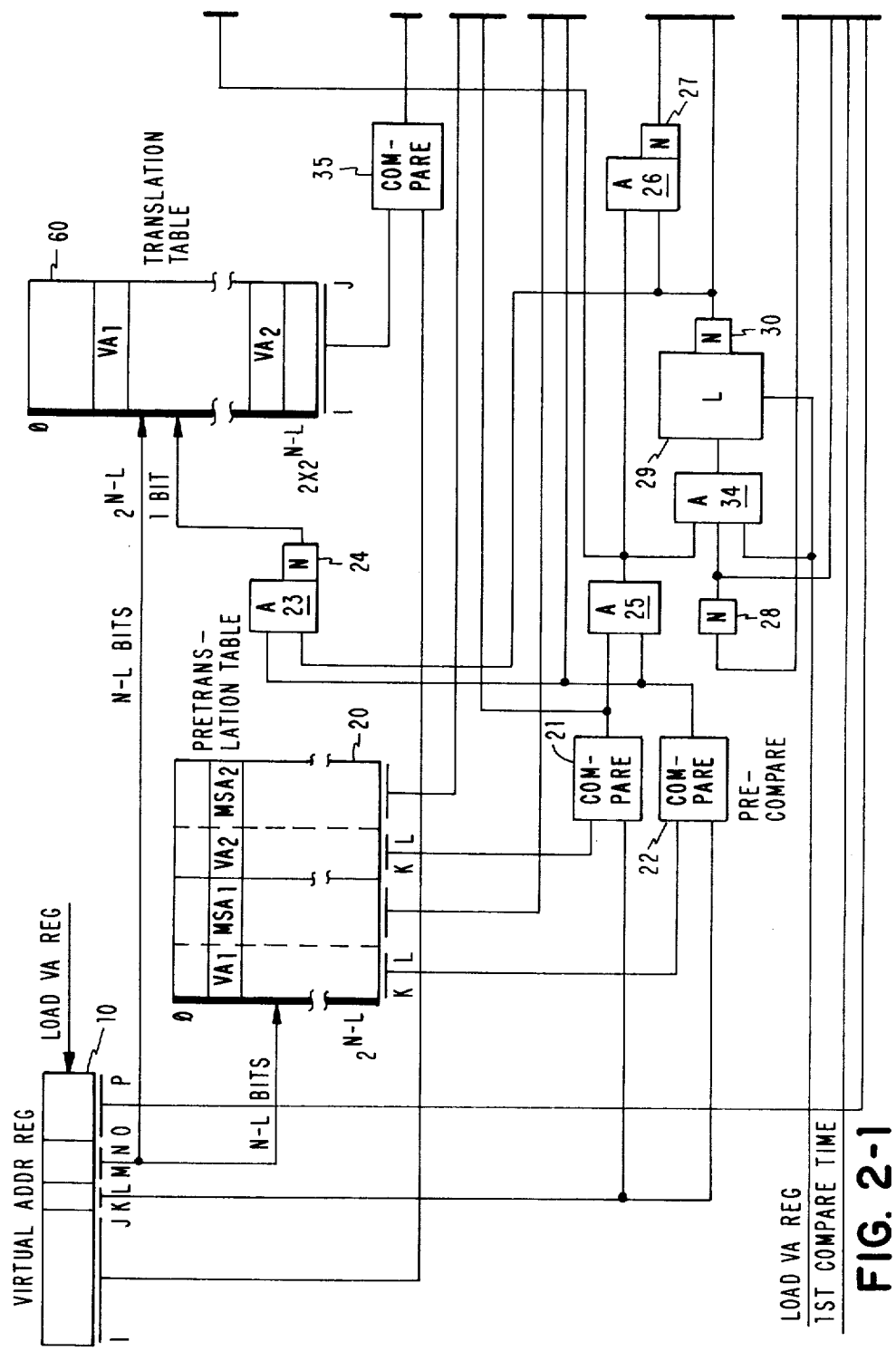
Figure 2:
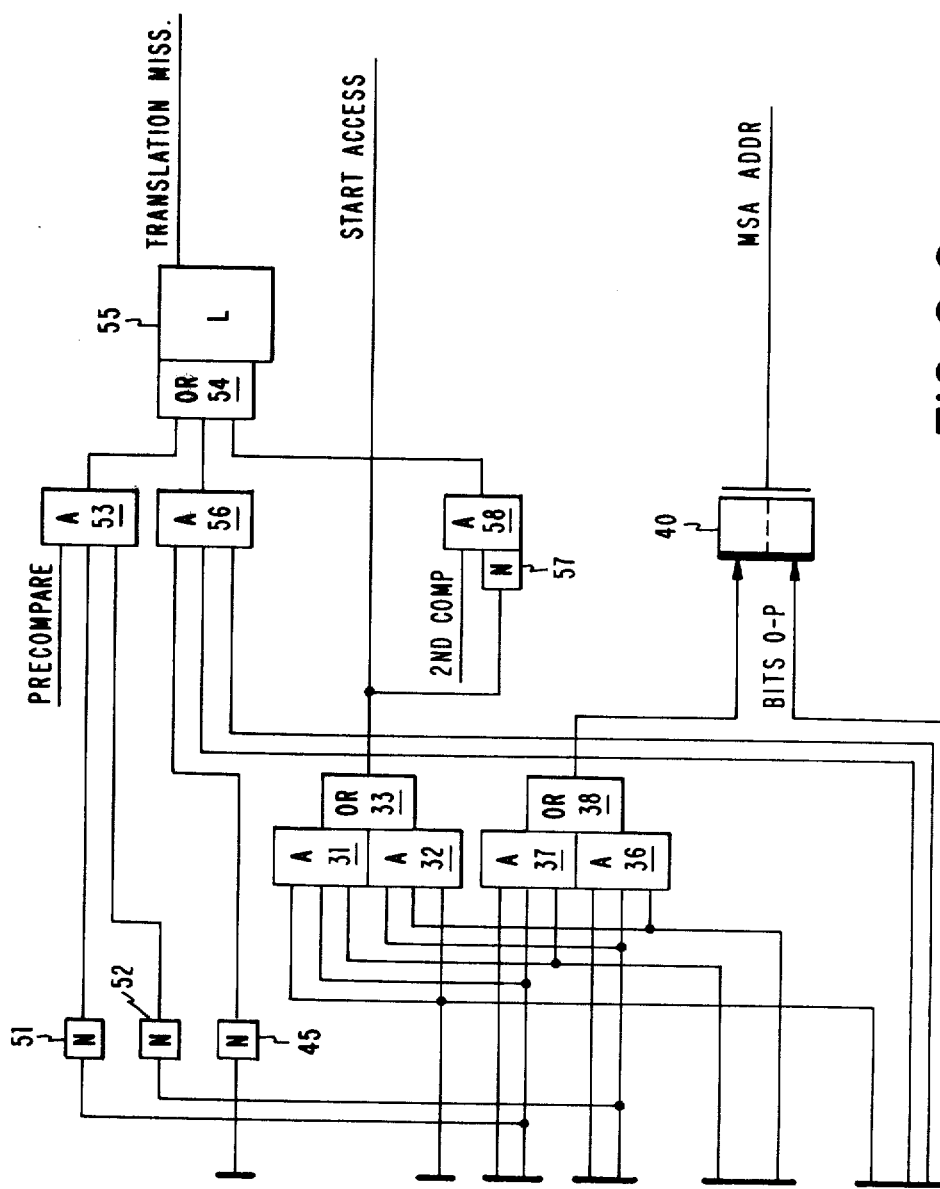

With reference to the drawings and particularly to FIGS. 1-1 and 1-2, the invention is illustrated by way of example with the virtual address to be translated contained in virtual address register 10. The virtual address is shown as consisting of bits 1-P which are divided into groups 1-J, K-L, M-N and O-P. In one particular implementation bits 1-J equal 32 bits and represent a segment indentification where a segment is a 64 K byte block of virtual storage. The K-L field of bits in that instance is a field of two bits where the two bits have the greatest discriminating power or the ones most likely to differ between virtual address translation candidates of a pair of candidates. Pre-translation table 20 in FIG. 1 contains K-L bits for each virtual address translation candidate in translation table 60. Pre-translation table 20; however, is only half as long as translation table 60 because the K-L bits for one virtual address translation candidate is paired and resides in the same row with K-L bits for another virtual address translation candidate.

The M-N field of bits in register 10 is generally a field of bits sufficient to address the number of entries in the pre-translation table 20. For example, if pre-translation table 20 had 64 rows of entries, then the field M-N would contain 6 bits. The group of bits K-N generally are considered page identifier (PID) bits. The field of bits O-P are byte identifer (BID) bits for identifying a byte within a virtual page. It should also be noted that a virtual page is the same size as a real page and thus the byte identifier field forms part of the real address. For a page size of 512 bytes, the byte identifier or the field O-P is nine bits. Thus virtual address register 10 in this particular example has a capacity for holding a 48 bit virtual address.

Translation table 60 has twice the number of entries or rows compared to pre-translation table 20. Pre-translation table 20 is implemented in latches or a very fast array whereas translation table 60 is implemented in a slower and wider array. Pre-translation table 20 is 4 bits wide and as a minimum translation table 60 is 44 bits wide where 32 of the 44 bits are virtual address bits corresponding to the segment bits of the virtual address and 12 bits are the translated main storage address or frame identifier (FID) bits where a frame corresponds to a page in real storage. The candidates or entries placed in translation table 60 are paired because two virtual addresses can translate to the same translation table address or index and an instruction set can include instructions having two addresses. The paired entries are placed from each other so as to be a fixed, pre-determined distance apart where the separation is a bit state difference of the high order address bit of the address for addressing the translation table.

The pre-translation table 20 and translation table 60 are simultaneously presented with address bits N-L of the field of bits M-N from virtual address register 10. The addressed location in pre-translation table 20 is accessed quicker than the addressed location in translation table 60 when pre-translation table 20 is implemented in higher speed circuitry than translation table 60. The two sets of K-L bits read from pre-translation table 20 are applied to precompare circuits 21 and 22 which function to compare the K-L bits from pre-translation table 20 with the K-L bits from virtual address register 10.

The output of compare circuit 22 is applied to AND circuits 23, 25 and 32. The output of compare circuit 21 is applied to AND circuits 25 and 31. By this arrangement if compare circuit 22 has an output for conditioning AND circuits 23, 25 and 32 but compare circuit 21 does not have an output for conditioning AND circuits 25 and 31, latch 29 will not be set by the output from AND circuit 25. Inverter 30, however, will invert the output of latch 29 to condition AND circuits 23 and 32. The output of AND circuit 23 is inverted by inverter 24. The output of inverter 24 is applied as an address high order bit line to translation table 60. Thus, whenever the K-L bits in virtual address register 10 compare with the VA1 K-L bits from pre-translation table 20, inverter 24 provides a zero high order address bit to translation table 60 whereby one of the VA1 entries and the associated MSA1 entries are read from translation table 60.

The VA1 addressed entry read from translation table 60 is applied to compare circuit 35 to be compared with the 1-J bits from virtual address register 10. The output of compare circuit 35 is applied to AND circuits 31 and 32 which feed OR circuit 33. Thus in the instance where compare circuit 22 has an output, AND circuit 32 will pass a start access signal via OR circuit 33 to main storage, not shown. The associated MSA1 bits read from the addressed location in translation table 60 are entered into register 40 together with the O-P bits from virtual address register 10 to form the main storage address.

If the VA2 K-L bits from pre-translation table 20 had compared with the K-1 bits from virtual address register 10 and the VA1 K-L bits from pre-translation table 20 had not compared with the K-L bits from virtual address register 10, AND circuits 25 and 26 would not be satisfied. Inverter 27 would provide an output for conditioning AND circuit 31. Latch 29 would not be set and inverter 30 would provide a signal for conditioning AND circuit 23; however AND circuit 23 would not be satisfied because compare circuit 22 would not be providing an input to AND circuit 23. Thus inverter 24 would place the high order address bit to translation table 60 in the one state whereby a VA2 entry would be addressed. If the addressed VA2 entry compared equal to the 1-J bits from virtual address register 10, compare circuit 35 would pass a signal to condition AND circuit 31 which receives outputs from compare circuit 21 and from inverter 27. In this instance AND circuit 31 would pass a start access signal via OR circuit 33 to main storage so that the main storage address in register 40, which contains a main storage address formed from the MSA2 bits read from table 60 and the O-P bits from register 10, is effective.

Figure 3:
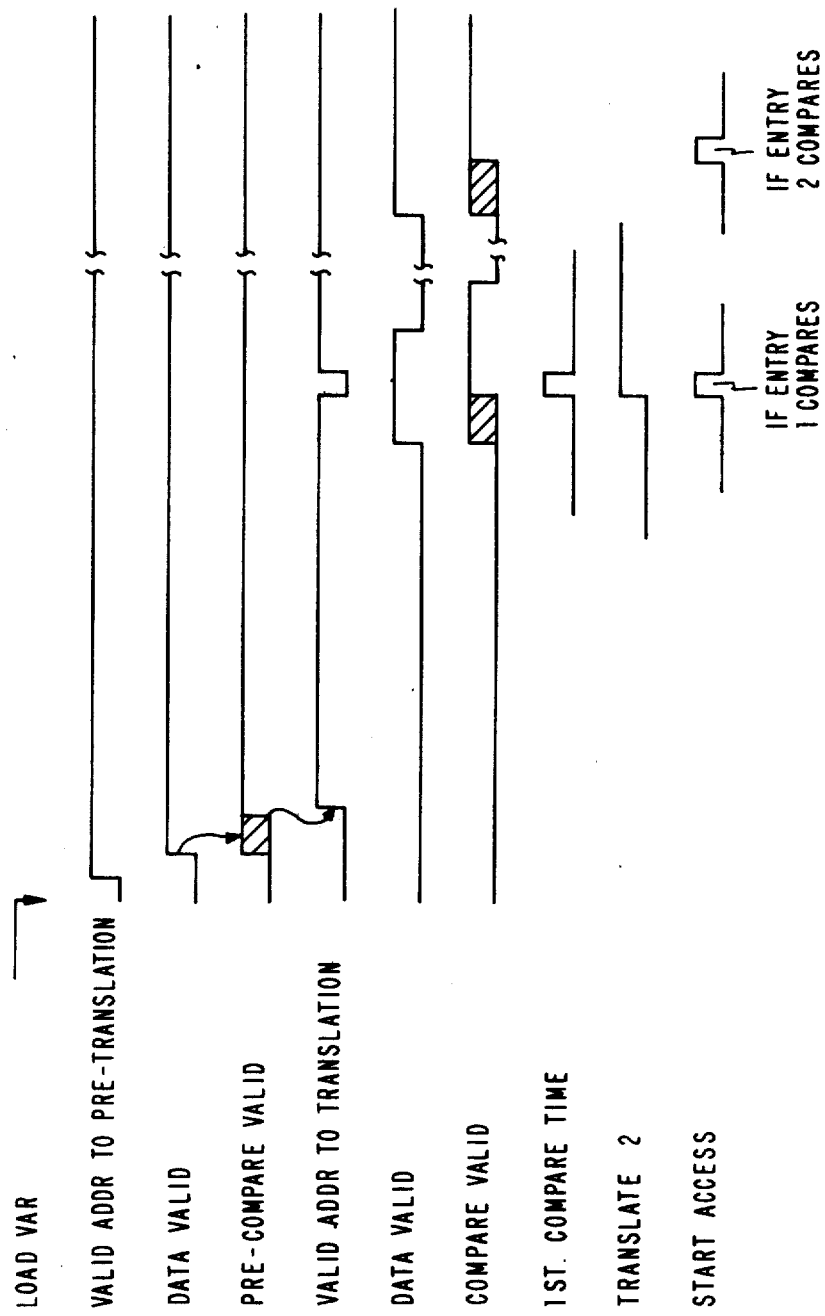
FIG. 3 is a timing diagram for the embodiment of FIGS. 1-1 and 1-2.

Whenever the VA1 K-L bits and the VA2 K-L bits compare equal simultaneously to the K-L bits from the virtual address register 10, AND circuit 25 is satisfied by the outputs of precompare circuits 21 and 22. Latch 29, however, will not be set until a 1st compare clock signal is applied to latch 29 via AND circuit 34 which also has inputs from AND circuit 25 and inverter 28. Hence, until latch 29 is set in response to the 1st compare clock signal which occurs in time as seen in FIG. 3, inverter 30 provides an output for conditioning AND circuits 23, 26 and 32. AND circuit 26 is thus satisfied and inverter 27 will decondition AND circuit 31. The inputs to AND circuit 23 are satisfied and inverter 24 provides a zero high order address bit to translation table 60 whereby the VA1 and MSA1 entries are addressed.

If the VA1 entry thus accessed fails to compare with the 1-J bits from virtual address register 10, the output of compare circuit 35 will not develop a start access signal via AND circuit 32 and OR circuit 33. Further the output of compare circuit 35 will be inverted by inverter 28 whereby latch 29 becomes setable and is set by the 1st compare clock signal via AND circuit 34. The output of inverter 30 deconditions AND circuits 23, 26 and 32.

With AND circuit 23 deconditioned, inverter 24 changes the high order address bit to a one state whereby the VA2 and MSA2 entries in translation table 60 are accessed. AND circuit 31 is reconditioned by the output of inverter 27. If the accessed VA2 entry compares with the 1-J bits from virtual address register 10, AND circuit 31 passes a start access signal via OR circuit 33 to main storage.

Latch 29 is reset by a Load VA REG signal so as to be in the reset state at the start of the next virtual address translation. If neither the VA1 K-L bits or the VA2 K-L bits compare with the K-L bits from the virtual address register 10, no start access signal will be generated because neither AND circuit 31 nor AND circuit 32 will be satisfied. A translation miss is recognized, however the action taken in response to the translation miss is not part of the present invention.

A translation miss can be detected at any one of three different times. A translation miss can be detected at pre-compare time if neither compare circuit 21 nor compare circuit 22 has an output. This condition is detected by AND circuit 53 which receives a precompare timing signal and signals from inverters 51 and 52 which are connected to the outputs of compare circuits 21 and 22 respectively. A translation miss can also occur at first compare time and this is detected by AND circuit 56 which receives the 1st compare clock timing signal and input from inverter 28 indicating a lack of compare by compare circuit 35 and an input from inverter 45 indicating a lack of compare from both pre-compare circuits 21 and 22. A translation miss can also occur after a second compare by compare circuit 35. This translation miss is detected by AND circuit 58 which receives an input from inverter 57 and a 2nd compare timing signal. Inverter 57 provides a signal indicating the lack of a start access signal.

The timing diagram in FIG. 3 is for the embodiment of the invention illustrated in FIGS. 1-1 and 1-2. The virtual address register 10 is loaded under control of a Load VA REG signal. Shortly thereafter, a valid address is available to the pre-translation table 20. Although the same address is made available to the translation table 60, that address is not valid until the high order bit becomes available as a result of the precompare. The data from the pre-translation table, i.e., the K-1 bits then become available and shortly thereafter the precompare becomes valid. Shortly after the precompare, the address to the translation table becomes valid. The data from the translation table 60 is then valid after a relatively long access time compared to the time the data from pre-translation table 20 becomes valid. The main storage translated address becomes valid at the same time the data becomes valid. Shortly after the data becomes valid, the compare becomes valid. If the first compare fails and assuming both precompares had been valid, then a second compare is made. This second compare operation is initiated by the 1st compare timing signal whereby a new valid address is presented to the translation table 60. Data then becomes available from the translation table together with the translated main storage address and a second compare is made.

The performance of the virtual address translation operation can be improved by removing the main storage translated address from the translation table 60 and building it into the pre-translation table 20 as shown in FIGS. 2-1 and 2-2. By this arrangement the translated main storage address becomes available at the time data becomes valid from translation table 20. The main storage access, however, does not take place until the start access signal becomes available. The overall main storage access, however, is improved when the main storage address is available earlier because many implementations of main storage require that the address be available for some pre-conditioning time prior to actually starting the access. Hence, if the pre-conditioning can start earlier so as to be substantially complete by the time the start access signal is available, the period of delay which would otherwise exist can be substantially eliminated. The removal of the main storage address from the translation table 60, of course, makes array 60 a narrower array and thereby a cheaper array. On the other hand, the wider pre-translation table 20 adds to the cost. The invention, however, does permit a cost performance tradeoff. For the implementation of FIGS. 2-1 and 2-2, AND circuits 36 and 37 are added to control the gating of the main storage addresses MSA1 and MSA2 respectively via OR circuit 38 into register 40. Otherwise the embodiment of FIG. 2 except for the changes already noted is quite similar to the embodiment of FIG. 1.

Figure 4:
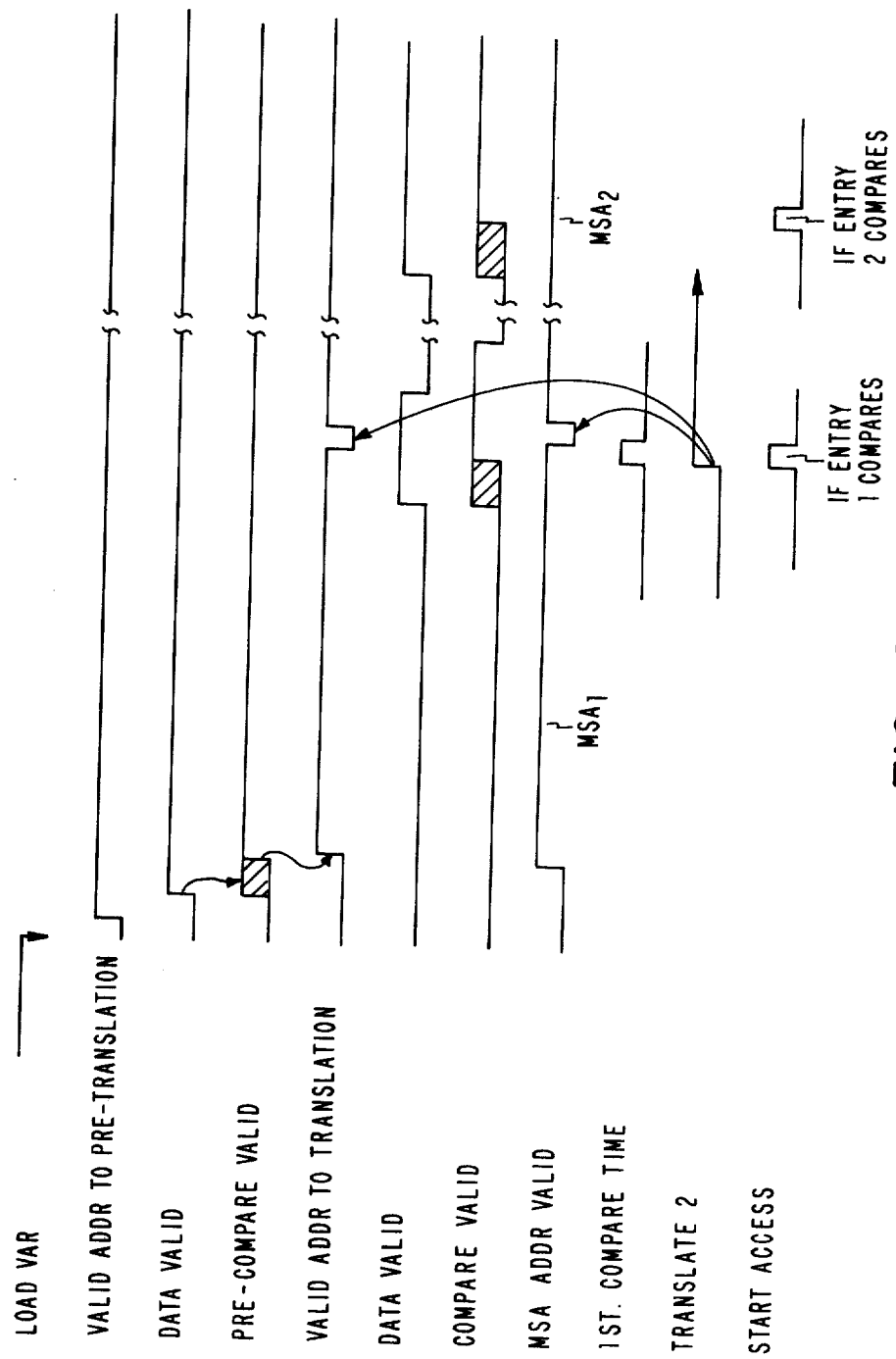
FIG. 4 is a timing diagram for the embodiment of FIGS. 2-1 and 2-2.

The timing diagram in FIG. 4 is for the embodiment of FIGS. 2-1 and 2-2. The timing diagram in FIG. 4 is similar to the timing diagram of FIG. 3 except that the main store address becomes valid much sooner.

From the foregoing it is seen that the present invention enables the use of a narrower array for the translation table and is an improvement over the use of a narrow array where the candidates for the translation process are sequentially accessed nonpreferentially from the translation table.

Having thus described the invention, what is claimed as new, and desired to be secured by Letters Patent is:

1. Address translation apparatus comprising:
    address register means for storing an address to be translated where said address has a fixed number of bits,
    an addressable translation table for storing pairs of address translate candidates alongside with associated translated addresses for each translatable address, said pairs of address translate candidates and translated addresses being stored in noncontiguous locations in said translation table,
    an addressable pre-translation table for storing pairs of partial addresses at single addressable locations,
    means for simultaneously applying address signals to said translation table and said pre-translation table based upon the states of a first predetermined group of bits in said address register means,
    a pair of precompare logic means connected to compare an addressed pair of partial addresses with a second predetermined group of bits in said address register means, each precompare logic means of said pair of precompare logic means generating a comparison result signal indicating an equal or unequal comparison,
    means for applying said comparison result signal from one of said precompare logic means aa an address signal to said translation table to complete the addressing of said translation table whereby the address translate candidate and associated translated address are read from the addressed location,
    compare logic means for comparing a third predetermined group of bits in said address register means with the address translate candidate read from the addressed location in said translation table, and for generating a comparison result signal indicating an equal or unequal comparison, and means for inverting said result signal from said one of said precompare logic means in response to said result signal from said compare logic means indicating an unequal comparison whereby the address to said translation table is changed and the paired translate candidate and associated translated address are read from said translation table.

2. The address translation apparatus of claim 1 further comprising start storage access logic circuit means for generating a start storage access signal in response to a comparison result signal from one of said precompare logic means and an equal comparison signal from said compare logic means.

3. The address translation apparatus of claim 1 wherein said pre-translation table is formed from higher speed circuitry than said translation table.

4. The address translation apparatus of claim 1 further comprising means for generating a signal indicating a translation miss in response to the absence of an equal comparison result signal from either of said pair of precompare logic means.

5. The address translation apparatus of claim 1 wherein said means for applying said comparison result signal from one of said precompare logic means as an address signal to said translation table applies said comparison result signal as a high order address bit.

6. The address translation apparatus of claim 1 wherein said pairs of translate candidates and associated translated addresses are stored at locations in said addressable translation table a distance apart equal to the significance of the high order address bit of the address for addressing said addressable translation table.

7. The address translation apparatus of claim 1 wherein the number of addressable locations in said pre-translation table are half the number of addressable locations in said translation table.

8. Address translation apparatus comprising:

address register means for storing an address to be translated where said address has a fixed number of bits, an addressable pre-translation table for storing pairs of partial addresses and pairs of translated addresses at single addressable locations, an addressable translation table for storing pairs of translation candidates for each translatable address, said pairs of translation candidates being stored in noncontiguous locations in said translation table, means for simultaneously applying address signals to said pre-translation table and said translation table based upon states of a first predetermined groups of bits in said address register means, a pair of precompare logic means connected to compare an addressed pair of partial addresses read from said pre-translation table with a second predetermined group of bits in said address register means, each precompare logic means of said pair of precompare logic means generating a comparison result signal indicating an equal or unequal comparison, means for applying said comparison result signal from one of said precompare logic means as an address signal to said translation table to complete the addressing of said translation table whereby an address translation candidate is read from the addressed location, compare logic means for comparing a third predetermined group of bits in said address register means with said translation candidate read from said translation table and for generating a comparison result signal indicating an equal or unequal comparison, means for inverting said result signal from one of said precompare logic means in response to said result signal from said compare logic means indicating an unequal comparison whereby the address to said translation table is changed and the paired translation candidate is read from said translation table, and, a pair of logic gating means connected to receive an addressed pair of translated addresses from said pretranslation table and responsive to an equal comparison result signal from one of said precompare logic means to pass one of said translated addresses and responsive to an unequal comparison signal from said compare logic means and an equal compare signal from the other of said precompare logic means for passing the other of said translated addresses.

* * * * *